(12) United States Patent
Masuda et al.

(10) Patent No.: US 6,458,725 B1
(45) Date of Patent: Oct. 1, 2002

(54) AIRBAG BASE FABRIC

(75) Inventors: Yasushi Masuda, Tokyo (JP); Akira Kokeguchi, Tokyo (JP); Ryosuke Nakanishi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/442,941

(22) Filed: Nov. 18, 1999

(30) Foreign Application Priority Data

Nov. 20, 1998 (JP) .......................................... 10-331111

(51) Int. Cl.[7] .............................................. D03D 15/00
(52) U.S. Cl. ...................... 442/189; 280/728.1; 57/204; 57/206; 57/243; 57/244; 428/36.1; 428/36.3; 428/902; 442/60; 442/76; 442/181
(58) Field of Search ..................... 280/728.1; 57/204, 57/206, 243, 244; 428/36.1, 36.3, 902; 442/60, 76, 181, 189

(56) References Cited

U.S. PATENT DOCUMENTS 5,215,795 A * 6/1993 Matsumoto et al. ....... 428/36.1
5,637,385 A 6/1997 Mizuki et al. ............... 442/361
6,164,692 A * 12/2000 Takeuchi ..................... 280/733

FOREIGN PATENT DOCUMENTS

| EP | 0 558 762 | 9/1993 | |
| JP | 04056653 A * | 2/1990 | ........... B60R/21/16 |
| JP | 04121251 A * | 9/1990 | ........... B60R/21/16 |
| JP | 4-352843 | 12/1992 | |
| JP | 6-33336 | 2/1994 | |
| JP | 6-306729 | 11/1994 | |
| JP | 8-134721 | 5/1996 | |
| JP | 8-325888 | 12/1996 | |

* cited by examiner

Primary Examiner—Terrel Morris
Assistant Examiner—Arti R. Singh
(74) Attorney, Agent, or Firm—Kanesaka & Takeuchi

(57) ABSTRACT

An airbag base fabric is formed of thermoplastic synthetic filament yarns, wherein the yarn strength of the filament yarn is 7.0 g/denier or more and the fineness of the filament yarn is 200–250 denier. The fabric is thin and lightweight, which is thus excellent in accommodation, and is effective in reducing the size and weight of an airbag module.

6 Claims, No Drawings

AIRBAG BASE FABRIC

BACKGROUND OF THE INVENTION AND RELATED ART STATEMENT

The present invention relates to a base fabric for use in an airbag and, more particularly, to an airbag base fabric which is thin and lightweight and is thus effective in reducing size and weight of an airbag module.

Conventionally, a base fabric for use in an airbag of an airbag module is normally a woven fabric made of synthetic filament yarns having fineness from 420 denier to 630 denier and coated with an elastomer or the like.

The conventional base fabric for use in an airbag, which is made of filament yarns having fineness of 420–630 denier, is quite thick because the woven fabric itself is thick and is additionally coated with resin. Since the folded airbag therefore has a large volume and is heavy, the conventional base fabric is not suitable for reduction in size and weight of the airbag module.

Especially recently, a head protective side airbag disposed along a roof side rail has been employed widely. Since there is a small space for accommodating an airbag along the roof side rail, the further reduction in size is required.

It is an object of the present invention to solve the conventional problem and to provide an airbag base fabric which is thin and lightweight and is thus excellent to be accommodated in a small space, so that it is effective in reducing size and weight of an airbag module.

SUMMARY OF THE INVENTION

An airbag base fabric of the present invention is composed of thermoplastic synthetic filament yarns, wherein the filament yarn has a strength of 7.0 g/denier or more and fineness of 200–250 denier.

The thin filament yarns, fineness of which is 200–250 denier, enables to provide an airbag base fabric which is thin and lightweight, can be easily folded, and is thus excellent to be accommodated. Since the filament yarns are thin, the weave pattern or density is fine, thereby making the air permeability low. Gas leakage can be prevented even without resin coating or only with a thin coating. This improves the surface smoothness and can further reduce the size of the airbag.

If the filament yarns are too thin, the strength of the obtained airbag base fabric may be insufficient. According to the present invention, however, since the filament yarns having yarn strength of 7.0 g/denier or more are employed, the reduction in strength due to fineness is prevented.

Preferably employed as filament yarns are polyamide yarns or polyester yarns. By weaving such filament yarns with the number of 50 yarns/inch or more, an airbag base fabric having smooth surface can be obtained which has high strength and quite low permeability even under high pressure.

DETAILED DESCRIPTION OF THE INVENTION

Hereinafter, an embodiment of the present invention will be described.

Examples of filament yarns composing an airbag base fabric of the present invention are polyamide yarns and polyester yarns, preferably, polyamide yarns of nylon or the like.

In the present invention, the filament yarn has yarn strength exceeding 7.0 g/denier and fineness from 200 denier to 250 denier.

A filament yarn having the yarn strength less than 7.0 g/denier can not provide enough strength. Especially, the yarn strength is preferably 7.5 g/denier or more. In the present invention, the yarn strength of the filament yarn is hard to set at 9.7 g/denier or more because of its fine fabrication. Therefore, the preferable yarn strength is in a range of 7.5 to 9.7 g/denier.

In the present invention, if the filament yarn has fineness of 250 denier or more, the thinning and lightening of the airbag by making the filament yarn fine can not be expected. On the other hand, if the filament yarn has fineness of less than 200 denier, it can not provide enough strength, so that the above-mentioned filament yarn is not preferable. The most preferable fineness is 210 denier.

The filament yarn is preferably composed of 34–68 filaments, each having 3.1–6.2 denier.

The filament less than 3.1 denier can not provide sufficient filament strength. Accordingly, even when a large number of such filaments is gathered to form a filament yarn of 200–250 denier, the filament yarn may not have yarn strength of 7.0 g/denier or more. On the other hand, if the filament exceeds 6.2 denier, the number of filaments required to form a filament yarn of 200–250 denier is too small and the obtained filament yarn has undesirably high rigidity and high air permeability, so that the above-mentioned filament is not preferable.

In the present invention, the way of weaving the woven fabric composed of such filament yarns is normally plain weaving, but may be Jacquard weaving or hollow weaving.

The number of the filament yarns in the woven fabric is preferably 50 yarns/inch or more. If the number of the filament yarns is less than 50 yarns/inch, the obtained base fabric can not provide enough strength and enough permeation resistance. On the other hand, if the number of the filament yarns is too much, it increases the rigidity of the base fabric, so that it is hard to fold the obtained airbag and a larger package is required. Normally, the number of the filament yarns is preferably in a range from 68 to 75 filaments/inch.

The woven fabric according to the present invention may be treated by heat setting and/or calendering so as to allow the thickness to be thinner. These treatments further reduce the air permeability.

By using the aforementioned filament yarns with the aforementioned number thereof, and if necessary, by treatment of heat setting and/or calendering, the woven fabric forming the base fabric of the present invention is made to have a thickness of 0.15–0.25 mm preferably and to satisfy the condition that the quantity of airflow measured at 124.5 Pa is 0.8 $cm^3/cm^2$/sec or less in accordance with Fragile tester.

Since the woven fabric itself has quite low gas or air permeability, the woven fabric can be used as the airbag base fabric without resin coating. In the present invention, the woven fabric may be treated with resin coating of elastomer resin, such as silicone resin. In this case, since the woven fabric of this invention has quite low gas permeability, the amount of the coating resin can be significantly reduced as compared to the conventional one, that is, 5–25 g/m² of the coating resin will be enough. Thus, the reduced amount of the coating resin does not make the thickness of the base fabric too thick and heavy, and allows easy folding of the airbag.

The airbag base fabric of the present invention can be effectively used for the airbags of various types, such as a driver's airbag and a front passenger's airbag, and is particularly suitable for a head protective airbag to be accommodated adjacent to a roof side rail having a small accommodating space.

EXAMPLES

The present invention will be described concretely by means of examples and comparative examples.

Examples 1–7, Comparative Examples 1–4

Woven fabrics were made by using nylon yarns indicated in Table 1 with numbers indicated in Table 1 according to the plane weaving method, and were treated by heat setting and calendering. Some of them were coated by silicone resin coating (amount of coating resin is about 20 g/m²).

The thickness and the weight per unit area of the obtained airbag base fabrics are indicated in Table 1.

For each airbag base fabric, an amount of air permeation at 124.5 Pa according to Fragile tester and permeation resistance at 200 kPa, i.e. normal gas pressure during the deployment of the airbag, were measured, and the tensile strength was also measured. The results are indicated in Table 1.

By using each base fabric, a driver's airbag with a capacity of 60 liters was made and folded. Bulk or specific volume of each folded airbag was measured. The results are also indicated in Table 1.

The conditions for treatment by the heat setting and calendering are as follows.

Heat Setting Condition

Temperature : 170–200° C.

Processing Speed : 15–25 m/min

Calendering Condition

Temperature : 180–200° C.

Processing Speed : 10–15 m/min

Linear Load : 250–300 kg/cm

From Table 1, it is found that the airbag base fabric of the present invention enables the reduction in size and weight of airbags.

As described above, the present invention can provide an airbag base fabric which is thin and lightweight and is thus excellent in accommodation, so that it is effective in reducing size and weight of an airbag module.

While the invention has been explained with reference to the specific embodiment of the invention, the explanation is illustrative and the invention is limited only by the appended claims.

TABLE 1

| | | FILAMENT YARN | | | | | | AIRBAG BASE FABRIC | | | | |
|---|---|---|---|---|---|---|---|---|---|---|---|---|
| EXAMPLES | | FILAMENT DENIER (d) | NO. OF FILAMENT | FINENESS (d) | YARN STRENGTH (g/d) | COUNT (per Inch) | RESIN COATING | THICKNESS (mm) | WEIGHT (g/m²) | AMOUNT OF AIR PERMEATION (cm³/cm²/sec) | PERMEATION RESISTANCE AT HIGH PRESSURE (%)[1] | TENSILE STRENGTH (kgf/cm) | BULK WHEN FOLDED (specific volume)[2] |
| EXAMPLES | 1 | 3.1 | 68 | 210 | 8.3 | 53 × 53 | None | 0.19 | 105 | 3.5 or less | 25 | 35 or more | 65 |
| | 2 | 6.2 | 34 | 210 | 8.3 | 64 × 64 | None | 0.22 | 130 | 3 or less | 30 | 40 or more | 68 |
| | 3 | 3.1 | 68 | 210 | 8.3 | 70 × 70 | None | 0.22 | 145 | 0.7 or less | 45 | 40 or more | 70 |
| | 4 | 6.2 | 34 | 210 | 8.3 | 72 × 72 | None | 0.22 | 155 | 0.3 or less | 50 | 45 or more | 70 |
| | 5 | 5.8 | 36 | 210 | 9.5 | 75 × 75 | None | 0.22 | 155 | 0.2 or less | 50 | 50 or more | 70 |
| | 6 | 6.2 | 34 | 210 | 8.3 | 64 × 64 | Coated | 0.23 | 150 | 0 | 99 | 40 or more | 80 |
| | 7 | 3.1 | 68 | 210 | 8.3 | 70 × 70 | Coated | 0.22 | 165 | 0 | 100 | 40 or more | 75 |
| COMPARATIVE EXAMPLES | 1 | 4.3 | 72 | 315 | 8.8 | 58 × 58 | None | 0.24 | 165 | 0.4 or less | 30 | 55 or more | 80 |
| | 2 | 5.8 | 72 | 420 | 8.8 | 46 × 46 | None | 0.28 | 180 | 0.6 or less | 25 | 65 or more | 95 |
| | 3 | 4.3 | 72 | 315 | 8.8 | 58 × 58 | Coated | 0.24 | 195 | 0 | 100 | 55 or more | 85 |
| | 4 | 5.8 | 72 | 420 | 8.8 | 46 × 46 | Coated | 0.29 | 205 | 0 | 100 | 65 or more | 100 |

[1]Rate of retention for five seconds under pressure 2 kg/cm²
[2]Ratio relative to Comparative Example 4 as 100

What is claimed is:

1. An airbag base fabric comprising, thermoplastic synthetic filament yarns, each filament yarn having strength of 7.0 g/denier or more and fineness of 200–250 denier and being formed of 34–68 filaments, each filament having 3.1–6.2 denier, a count weave of the filament yarns being 50 yarns/inch or more in forming the fabric.

2. An airbag base fabric as claimed in claim 1, wherein the filament yarn is selected from a group consisting of polyamide yarn and polyester yarn.

3. An airbag base fabric as claimed in claim 2, wherein the strength of the filament yarn is between 7.5 and 9.7 g/denier.

4. An airbag base fabric as claimed in claim 1, wherein said base fabric has a thickness of 0.15–0.25 mm.

5. An airbag base fabric as claimed in claim 1, wherein said count weave of the filament yarns is 68–75 yarns/inch.

6. An airbag base fabric as claimed in claim 5, where in said base fabric has an airflow amount measured at 124.5 Pa is 0.8 $cm^3/cm^2$/sec or less.

* * * * *